United States Patent [19]
Sharon

[11] Patent Number: 4,997,233
[45] Date of Patent: Mar. 5, 1991

[54] INTEGRATED ENERGY ATTENTUATING VEHICLE PASSENGER SEAT

[75] Inventor: Baruch Sharon, Givat Shmuel, Israel

[73] Assignee: Israel Aircraft Industries, Ltd., Ben Gurion International Airport, Israel

[21] Appl. No.: 333,354

[22] Filed: Apr. 4, 1989

[30] Foreign Application Priority Data

Apr. 5, 1988 [IL] Israel ............................. 85984
Feb. 27, 1989 [IL] Israel ............................. 89432

[51] Int. Cl.⁵ .................................. B60R 21/00
[52] U.S. Cl. ................................. 297/216; 188/374; 244/122 R
[58] Field of Search .................. 297/216, 472; 244/122 R; 188/371

[56] References Cited

U.S. PATENT DOCUMENTS

| | | | |
|---|---|---|---|
| 3,026,972 | 3/1962 | Hendry et al. ............... | 188/374 |
| 3,680,913 | 8/1972 | Seybold ...................... | 188/374 X |
| 3,985,388 | 10/1976 | Hogan ........................ | 297/216 |
| 4,003,534 | 1/1977 | Kenigsberg et al. . | |
| 4,358,154 | 11/1982 | Campbell ................... | 297/216 |
| 4,523,730 | 6/1985 | Martin . | |
| 4,720,139 | 1/1988 | McSmith .................... | 297/216 |

FOREIGN PATENT DOCUMENTS

0078479 10/1982 European Pat. Off. .
0099677 6/1983 European Pat. Off. .
1077322 7/1965 United Kingdom .

OTHER PUBLICATIONS

George Marsh, Take Your Seat, Defense Helicopter World. Oct./Nov. 1986.
Aerospace Research Ass. Catalogue Information on Helicopter Armoured Crashworthy Seat.
AR-Services Commerciaux Antenne Technique Catalogue Information on Helicopter Crashworthy Seats.
Martin-Baker Catalogue Information on Helicopter Armoured Crashworthy Seat.

Primary Examiner—Laurie K. Cranmer
Attorney, Agent, or Firm—Darby & Darby

[57] ABSTRACT

A lightweight energy attenuating seat for a vehicle comprising apparatus for seating and integral impact energy dissipation and stroke guide apparatus including support apparatus for the apparatus for seating for absorbing impact energy that would otherwise be transferred thereto by permitting a regulated stroke thereof in a direction determined by the dissipation and stroke guide apparatus substantially parallel to a component of a force experienced by the integral apparatus.

17 Claims, 6 Drawing Sheets

INTEGRATED ENERGY ATTENUATING VEHICLE PASSENGER SEAT

FIELD OF THE INVENTION

The present invention relates generally to vehicle passenger safety systems and particularly to energy attenuating seats for use in aircraft.

BACKGROUND OF THE INVENTION

Various aircraft passenger crash survival systems are known. For fixed-wing aircraft, ejector systems are often employed and serve to eject a passenger from an aircraft prior to its crashing.

For helicopters and similar types of vertical takeoff aircraft, ejector systems, which are operative to eject a passenger from the aircraft in a generally upward direction, are generally combined with additional safety systems to prevent serious injury from the rotor blades to a person being ejected. It has been found that such systems, which include means for prior severance of the rotor blades, are very expensive.

As an aircraft crashes in a direction substantially parallel to the direction of gravitational acceleration, for a very short time after it has come to rest, passenger seats therein continue to travel downwards. In a case wherein the passenger does not leave the aircraft prior to its crashing, a reduction in the force transferred to the passenger would cause a corresponding reduction in the degree of injury that would otherwise be sustained by him.

Various energy absorbing systems have, therefore, been developed to reduce the force of an impact that would otherwise be transferred to a passenger in a vertical takeoff aircraft crash.

Several aircraft crash survival systems are documented in the Oct./Nov. 1986 issue of DEFENCE HELICOPTER WORLD, in an article entitled "Take Your Seat" by George Marsh.

In a typical crash situation, a vertical takeoff aircraft may fall from a height of 15-30 m with an acceleration upon impact of about 60-100 g. The aircraft may be expected to dissipate up to about 50% of the crash energy through the landing gear while approximately an additional 15% of the remainder will be dissipated through the controlled crash of the fuselage structure. The remaining crash energy should, therefore, ideally be absorbed by the passenger seat.

To illustrate the importance of dissipating crash energy before it is transferred to the passenger, it is noted that very severe spinal fractures have been found to be caused at approximately 30 g, while at about 40 g death is to be expected due to damage to both the spinal column and to the cardiovascular system. It has further been found that an acceleration of about 13.5 g is sustainable by the spinal column without causing irreversible damage thereto.

Disclosed in U.S. Pat. No. 4,523,730 to Martin is an energy absorbing seat arrangement, particularly for a helicopter, in which a seat pan is carried by a frame slidably mounted on parallel upwardly extending pillars secured to the helicopter. In normal conditions, downwards sliding of the frame on the pillars is prevented, in one embodiment, by metal rods fixed with respect to the pillars, and extending through drawing dies fixed with respect to the seat frame. In a variant the rods and dies are replaced by a deformable metal tube and a mandrel extending through the tube.

In the event of a crash in which rapid downward movement of the helicopter and the pillars is halted suddenly, the seat and seat frame continue to move downwardly, sliding along the pillars, while drawings of the rods through the dies, or of the mandrel through the tube, to dissipate the kinetic energy of the seat and its occupant relatively gradually.

The seat arrangement to Martin has a number of disadvantages, among which is the massiveness of its construction and its consequent weight. This is characterized by the presence of one assembly for permitting downward travel of the seat and another assembly, for absorbing crash energy in either of the ways described above. Typically, the seat to Martin has a weight of no less than about 15 kg.

A further disadvantage of Martin's seat is the lack of any apparatus for preventing rebound once the seat has completed a downward stroke.

Also available is a crashworthy seat for helicopter pilots and copilots using the 'Tor-Shok energy absorbing system' and manufactured by Aerospace Research Associates Inc., of 2017 West Garvey Ave., West Covinia, Calif. 91790, U.S.A..

In addition, available from Services Commerciaux et Antenne Technique of 16, rue Franklin, 75016, Paris, France are helicopter crashworthy seats for pilots, copilots and troops.

A disadvantage of 'crashworthy' seats in general is that they are generally not foldable and, therefore, when not in use, they take up potentially valuable cargo space within an aircraft.

SUMMARY OF THE INVENTION

It is an aim of the present invention to provide an integrated relatively lightweight passenger seat with impact energy attenuation for vertical takeoff aircraft.

It is also an aim of the invention to provide an energy attenuation system capable of reducing passenger seat experienced impact acceleration overcoming disadvantages of known art.

There is provided, therefore, in accordance with an embodiment of the invention, a lightweight energy attenuating seat for a vehicle comprising apparatus for seating and integral impact energy dissipation and stroke guide apparatus including support apparatus for the apparatus for seating for absorbing impact energy that would otherwise be transferred thereto by permitting a regulated stroke thereof in a direction determined by the dissipation and stroke guide apparatus substantially parallel to a component of a force experienced by the integral apparatus.

Additionally in accordance with an embodiment of the invention, the integral impact energy dissipation and stroke guide apparatus also comprises one or more tracks arranged parallel to the predetermined direction, and the support apparatus comprises one or more plastically deformable, support members, each having an alignment parallel to one of the tracks and being fixed thereto.

Further in accordance with an embodiment of the invention, the energy dissipation and stroke guide apparatus further comprises apparatus mounted in fixed association with the vehicle and mounted in association with each of the tracks for permitting a stroke of each of the plastically deformable support members in the predetermined direction as it experiences a force having a component in a direction parallel to the predetermined stroke direction and having a minimum predetermined rate of acceleration, the apparatus for permitting including an assembly for plastically deforming each of the plastically deformable, elongate support members as the stroke occurs.

Additionally in accordance with an embodiment of the invention, there is also provided apparatus for preventing rebound of the one or more support members through the apparatus for permitting.

BRIEF DESCRIPTION OF THE DRAWINGS

The present invention will be more fully understood and appreciated from the following detailed description taken in conjunction with the drawings, in which.

DETAILED DESCRIPTION OF A PREFERRED EMBODIMENT

Figure 1:
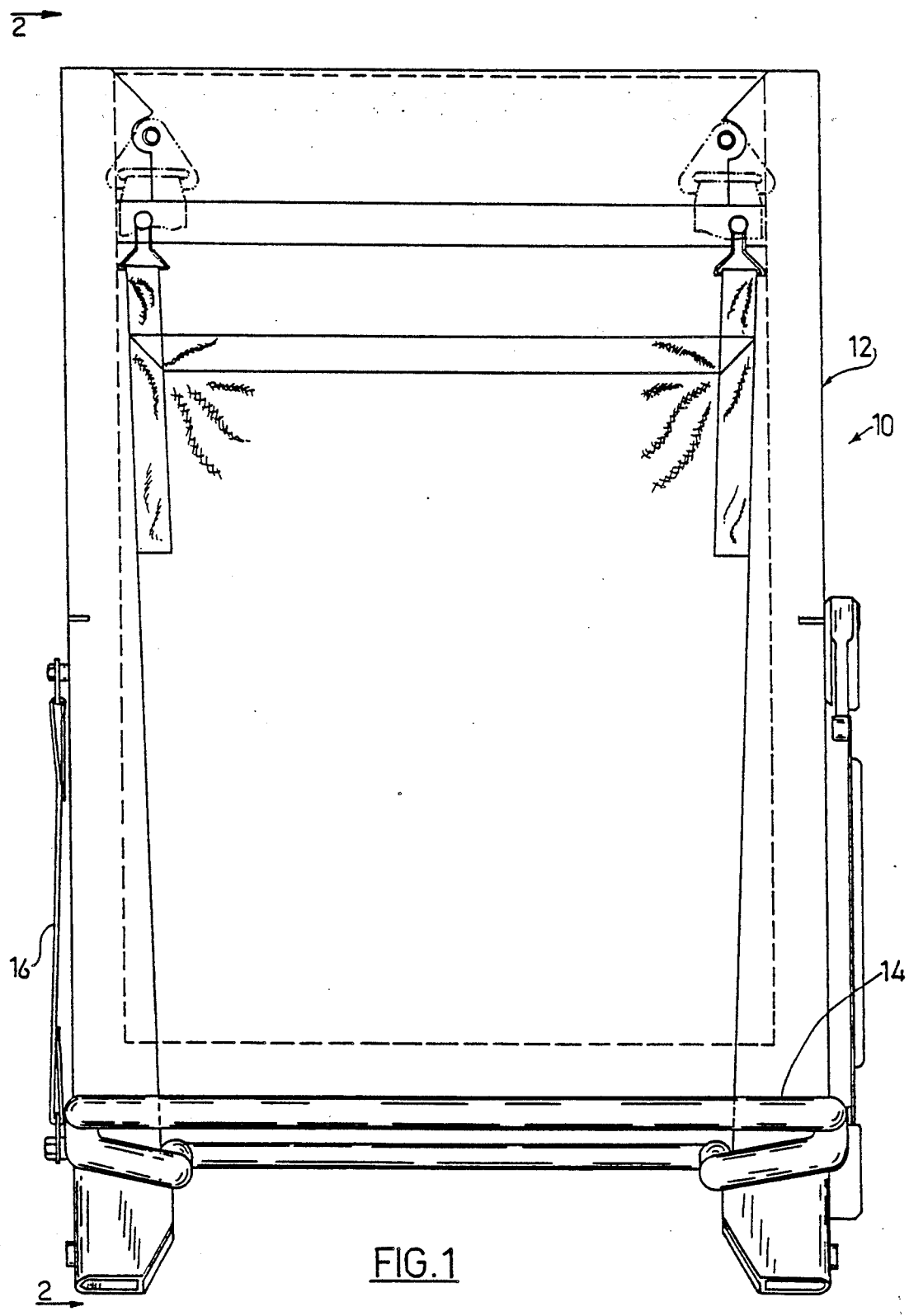
FIG. 1 is a front elevation of a lightweight passenger seat with an impact energy attenuation system for vertical takeoff aircraft.
Figure 2A:
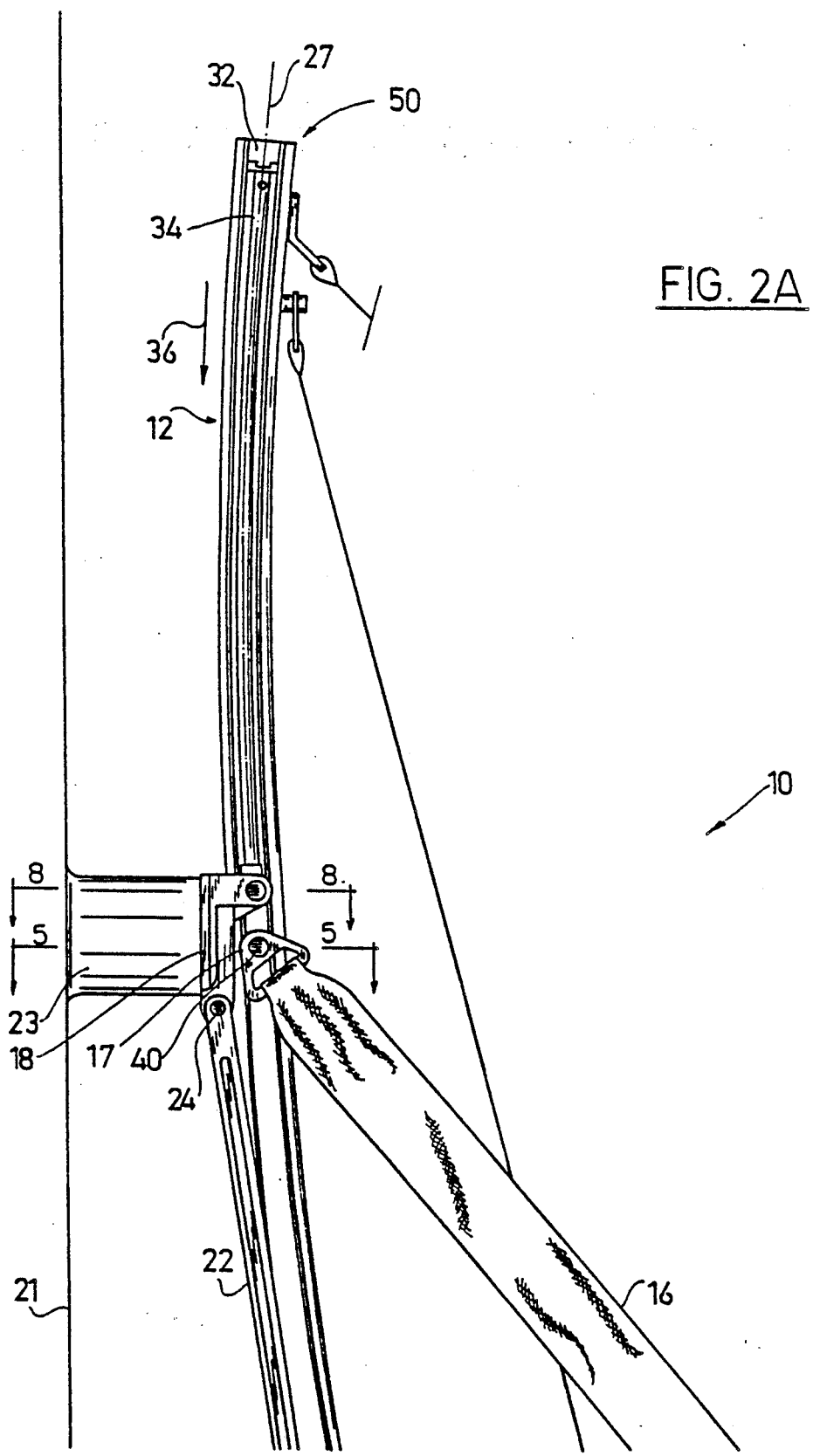
FIG. 2A and FIG. 2B show a side view of the seat shown in FIG. 1, taken in the direction of arrows 3—3 therein.
Figure 2B:
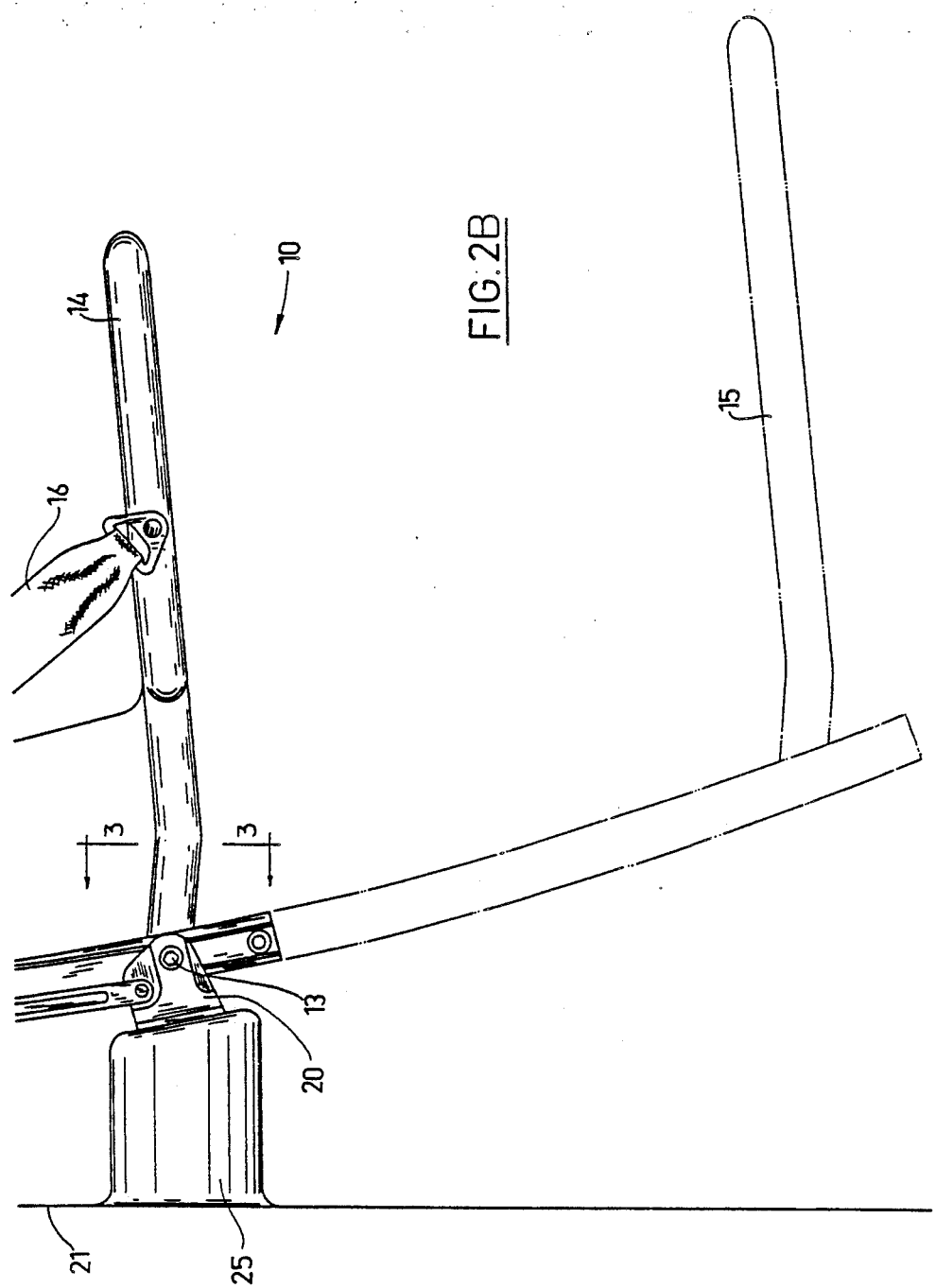

Reference is now made to FIGS. 1 and 2A, 2B which show a vehicle seat, referenced generally 10, constructed and operative according to a preferred embodiment of the invention. Seat 10 is principally intended for use as a military troop seat in a vertical takeoff aircraft, such as the Bell-Boeing V-22 "Osprey" aircraft, although this is not intended to limit the use of the present invention in other types of vehicle.

It is an important feature of the present invention that seat 10 is extremely light when compared to conventional crashworthy seats. Preferably, seat 10 has a gross weight of no more than about 4.4 Kg. Its low weight is due primarily to its integrated construction such that where possible, a single assembly provides two functions which, in conventional crashworthy seats are provided by separate assemblies. The precise nature of the integrated construction will be understood from the ensuing description.

Seat 10 comprises a support assembly, referenced generally 12, to which there is joined, as by a hinged connection 13, a ledge portion 14, for supporting a person in a sitting position. Ledge portion 14 is connected to a back support assembly typically by means of a web restraint 16, fastened to support assembly 12 by means of a connector plate 17.

It will be appreciated that the hinged nature of connection 13 and the use of web restraint 16 permit ledge portion 14 to be folded when the seat is not in use. This is of considerable importance as it frees potentially valuable cargo space within an aircraft when the seat is not in use.

As will be appreciated from the ensuing description, support assembly 12 comprises integral impact energy dissipation and stroke guide apparatus which is effective to absorb impact energy that would otherwise be transferred to ledge portion 14. The support assembly also defines, as described hereinbelow, a predetermined stroke direction through which the ledge portion is permitted to move under specified impact conditions.

Seat 10 is mounted onto a fixed track member (not shown) which lies along an axis 21 and which forms a structural element of the aircraft, by upper and lower support fittings, respectively referenced 18 and 20 and by upper and lower intermediate fixtures, respectively referenced 23 and 25. Upper intermediate fixture 23 is fixed to the track member as by a bolt.

Figure 3:
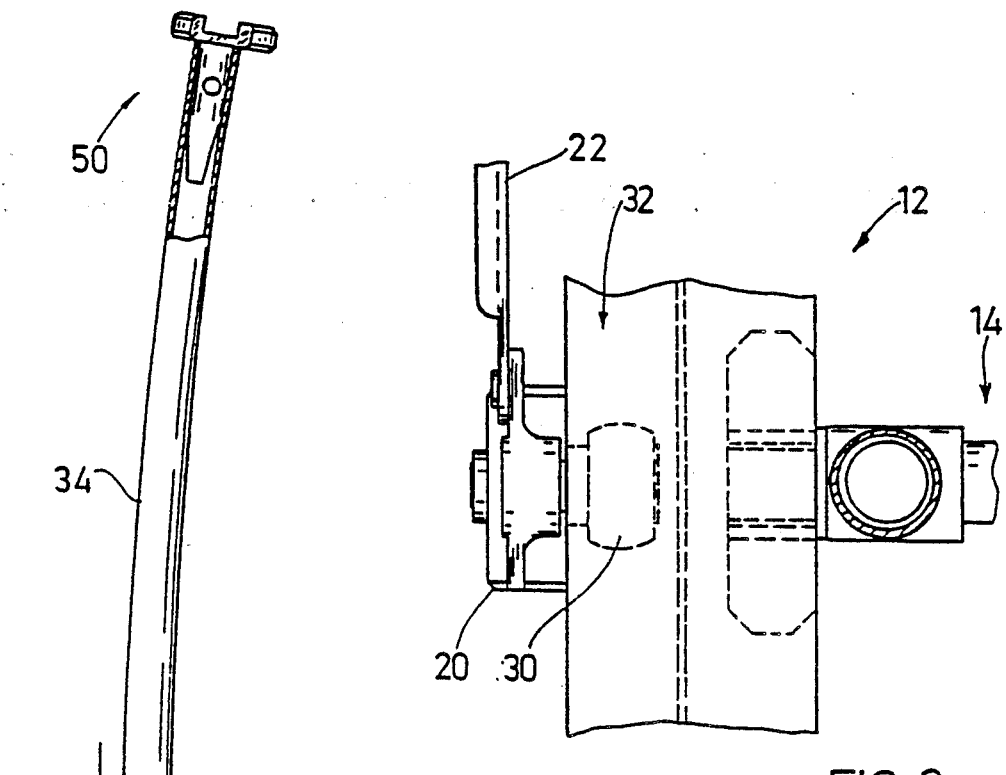
FIG. 3 is a cross-section taken in the direction of line III—III in FIG. 2B.

Lower intermediate fixture 25 is slidably supported within the fixed track member and upper and lower support fittings 18 and 20 are connected by means of a link 22. Link 22 is hingedly attached to upper support fitting 18 at a hinge location 24 and, as shown in FIG. 3, the link is attached to support fitting 20 and is also slidably supported in a track 32 defined by support assembly 12 by a roller 30.

Seat 10 is immovably fixed to the aircraft at a single location, namely, where it is connected to the aircraft via upper support fitting 18 and upper intermediate fixture 23. Hence, when a force is experienced by the seat in a direction parallel to arrow 36 (FIG. 2A), such as immediately after the aircraft has crashed and has come to rest, for a very short time the seat still seeks to travel in the indicated direction. The seat therefore undergoes a movement relative to the upper support fitting 18 along a stroke axis 27 (FIG. 2A) defined by track 32. As shown in FIG. 2, ledge portion 14 moves from an upper position, shown in solid lines, to a lower position 15, shown in broken lines.

Figure 4:
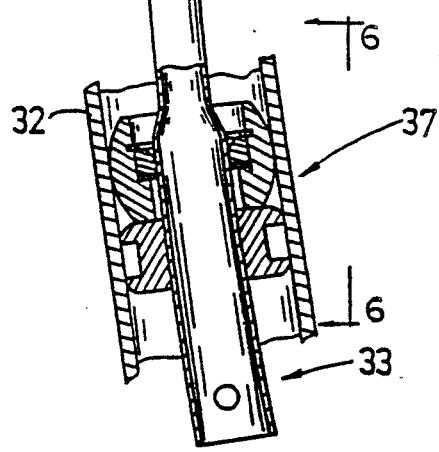
FIG. 4 is a partially cut away illustration of a deformable support element forming part of the energy attenuation system shown in FIGS. 1 and 2A, 2B.
Figure 5:
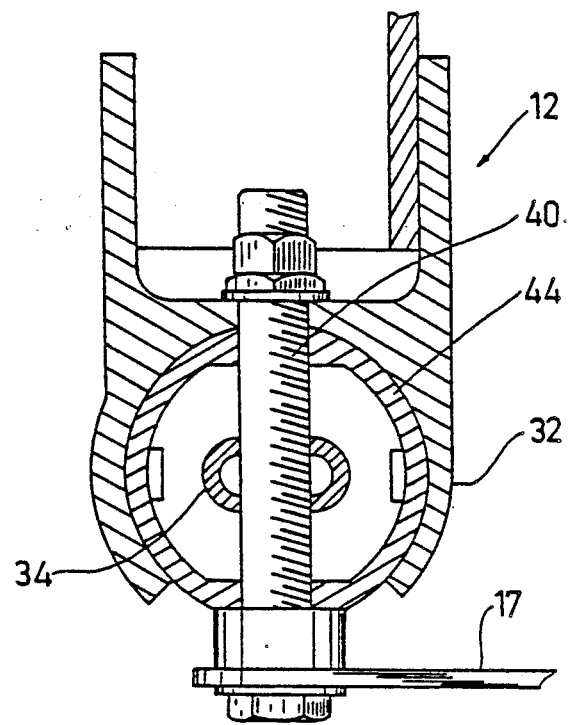
FIG. 5 is a cross-section taken along line 5—5 in FIG. 2A.
Figure 6:
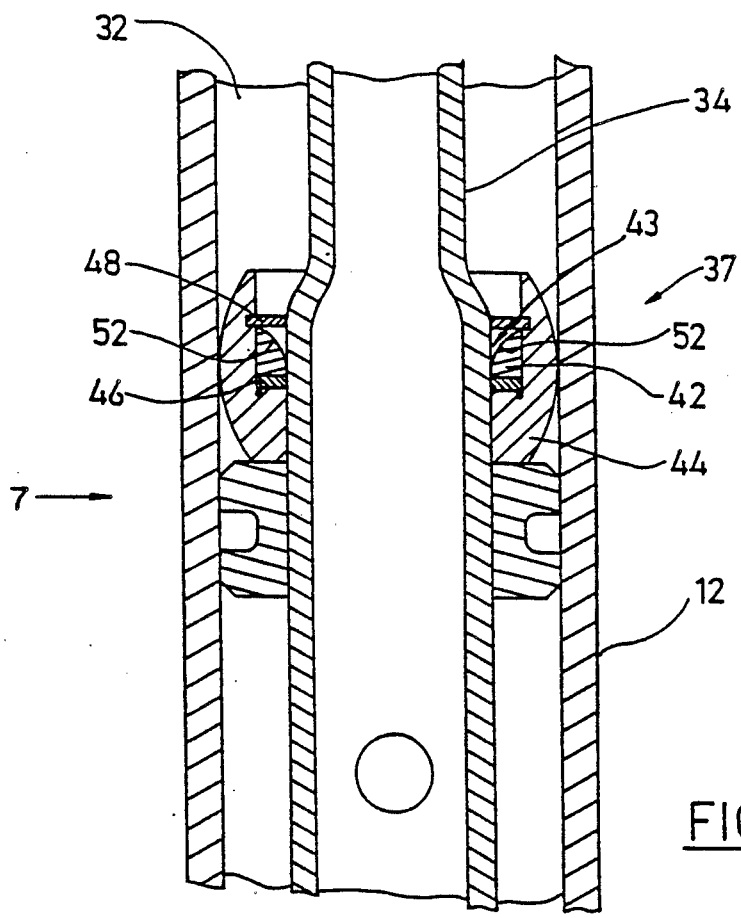
FIG. 6 is an enlarged view of detail 6 shown in FIG. 4.

With reference also to FIG. 4, there is shown an elongate support element 34 which is mounted within track 32. The support element is connected at a lower end 33 to a pin 40, which, as shown in FIG. 5, also connects connector plate 17 to support assembly 12. In a situation where no substantial force is applied to the seat, movement of support element 34 within track 32 is prevented by means of an energy dissipation assembly 37, which is described below in greater detail.

With conventional crashworthy seats, load bearing locations in a support structure therefor have to be specially strengthened, thus adding to the weight of the seat. In the present invention, pin 40, which transfers approximately half of the weight of a person seated in seat 10 to the support structure, is arranged so as to transfer its load to support element 34 which is in any case built to withstand high forces. The location of pin 40 as described is thus a further factor in reducing the overall weight of the seat of the present invention.

Referring now also to FIGS. 5, 6, 7 and 8, energy dissipation assembly 37 comprises a die 42 seated in a die housing 44. Die housing 44, which has a generally spherical external configuration, is seated within track 32 and, under high impact conditions constitutes a guide for element 34 as it moves generally downwards with the seat.

Die 42 is retained within die housing 44 by means of a retaining ring 48 that is keyed into the die housing. Support element 34 passes through a die aperture 43 at a location above lower end 33. As shown particularly in FIGS. 6 and 7, the respective cross-sectional configurations of support element 34 are different, it typically having a circular configuration above assembly 37 and a generally elliptical configuration below die 42.

According to the present invention, support element 34 is plastically deformable and preferably comprises a tube formed of an aluminium alloy. When a force having an acceleration of at least a predetermined magnitude is experienced by support assembly 12 in the direction of arrow 36, support element 34 is pulled along stroke axis 27 by the support assembly. It will, however, be appreciated that in order for this movement to occur, element 34 has to be forced through die 42.

As element 34 is forced through the die, plastic deformation of the element is effected and, as will be appreciated by persons skilled in the art, the deformation of element 32 in this way dissipates a large portion of the impact energy. It has been found, that using this technique, the acceleration force transferred to seat 10 and, consequently, to a passenger seated therein, may be reduced to a predetermined magnitude.

It will thus be appreciated that, as also implied hereinabove, support element 34 and energy dissipation assembly 37 together constitute an integrated assembly which serves to guide seat 10 along a predetermined stroke path, as well as to dissipate crash energy. This dual function of the integrated stroke guide and energy dissipation assembly is a further contributory factor in keeping the weight of the seat of the invention to a very low level.

According to a preferred embodiment of the invention, the predetermined magnitude is 13.5 g which, as outlined in the background of the invention, is a level that has been found to be sustainable by the human spine without causing irreversible damage thereto.

There is also provided a locking ring 46 which is typically made from stainless steel. Locking ring 46 is generally parallel to retaining ring 48 and is located between die 42 and housing 44. After having completed a stroke as described as described above, seat 10 seeks to rebound in the opposite direction, but is prevented from so doing by locking ring 46.

According to a preferred embodiment of the invention, while element 34 is made from an aluminium alloy, as stated above, die 42 and die housing 44 are made from a low alloy steel. In order to reduce the degree of friction between support element 34 and die 42 as tube 34 is thrust therethrough, the respective surfaces of both the support element and the die are made very smooth and support element 34 preferably also has an anodized low friction coating.

Figure 7:
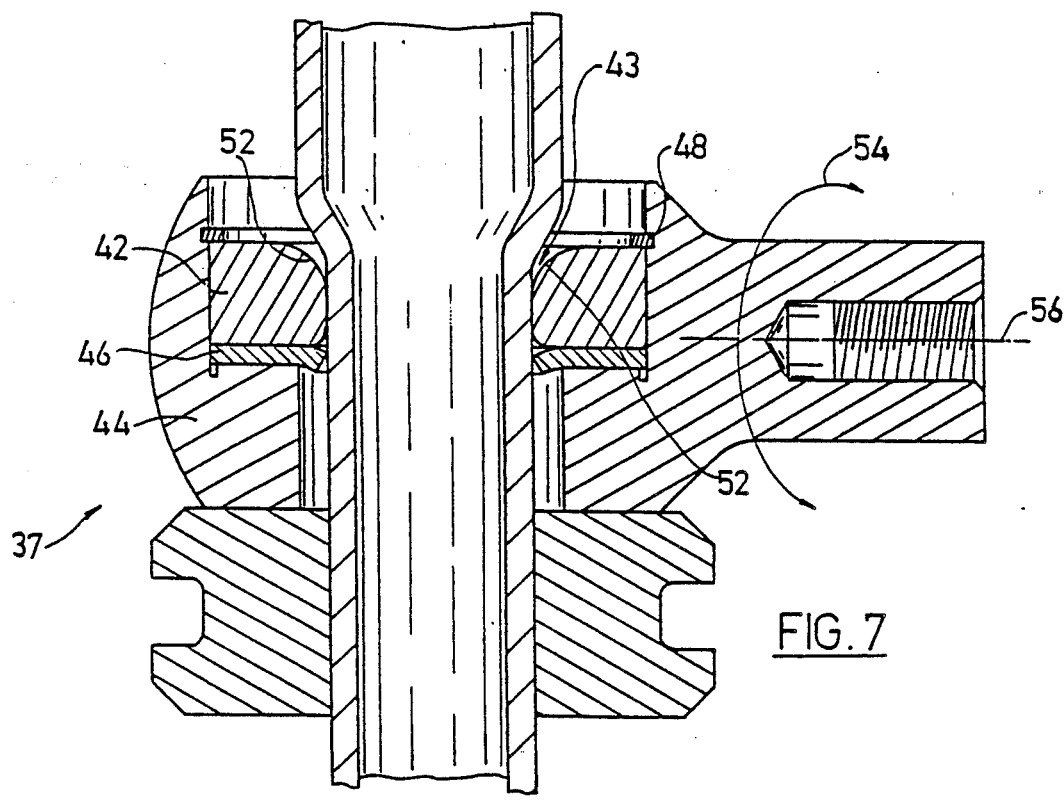
FIG. 7 is a cut away view of the apparatus shown in FIG. 6, taken in the direction of arrow 7 therein.
Figure 8:
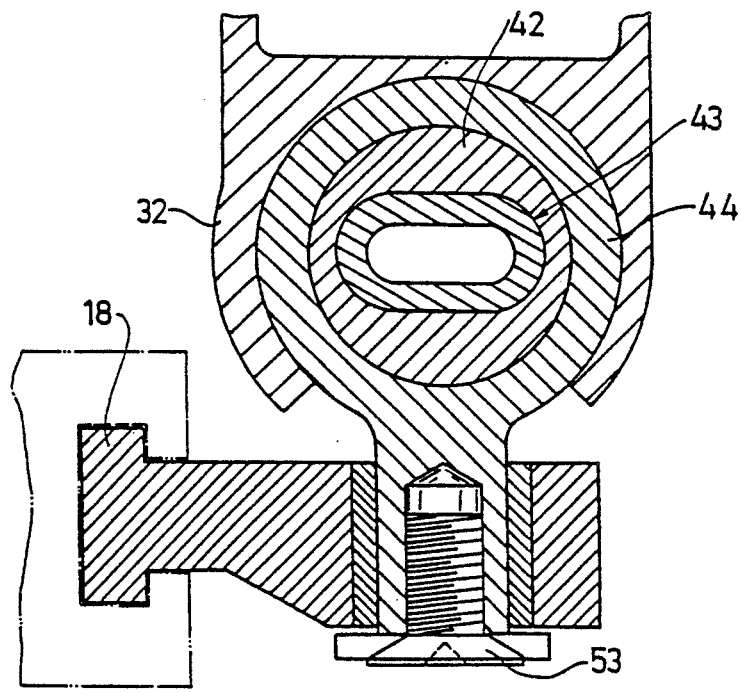
FIG. 8 is a cross-sectional view of a portion of the energy attenuation system shown in FIG. 2, taken along line 8—8 therein.

The spherical external configuration of die housing 44 is also intended to make energy dissipation thereby more effective. It has been found that a relatively large radius of die entry edge 52 provides easier entry of support element 34 into the die aperture and is thus effective to dissipate energy more efficiently than an entry edge with a relatively small radius. Furthermore, die housing 44 is not rigidly connected to fitting 18 but is, rather, connected thereto, as by a screw 53 (FIG. 8), with one degree of rotational freedom. As shown in FIG. 7, by an arrow 54, die housing 44 is arranged for rotation about an axis 56.

With particular reference to FIGS. 1 and 4, a cap 58 is provided at upper end 50 of support element 34 so as to prevent the support assembly from slipping out of its fittings after a maximum length stroke has taken place.

Cap 58 is typically built to withstand a force equivalent to 20 g.

It will be appreciated by persons skilled in the art that the present invention is not limited by what has been shown and described hereinabove. The scope of the invention is limited, rather, solely by the claims, which follow:

I claim:

1. A lightweight energy attenuating seat for a vehicle comprising:
    means for seating;
    integral impact energy dissipation and stroke guide means including:
    at least one track means;
    means for supporting said means for seating and comprising at least one elongate, plastically deformable, support member having a first cross-sectional configuration and being aligned parallel to said at least one track means and fixed thereto; and
    means mounted in fixed association with the vehicle and mounted in association with each of said at least one track means for permitting a stroke of said at least one plastically deformable support member in a predetermined direction defined by said at least one track means, as said at least one plastically deformable support member experiences a force having a component in a direction parallel to said predetermined direction and having at least a predetermined rate of acceleration, said means for permitting including at least one assembly for plastically deforming one of said at least one plastically deformable, elongate support member as said stroke occurs, each of said at least one assembly for plastically deforming comprising a die defining an aperture of a second cross-sectional configuration different from said first cross-sectional configuration and through which one of said at least one plastically deformable, elongate support member extends, movement of said one support member through said aperture and in said predetermined direction being operative to cause plastic deformation of said one support member so as to impart said second cross-sectional configuration to at least a portion of the length of said one support member and
    means for preventing rebound of said at least one support member through said means for permitting and comprising means arranged in touching contact with said one support member and associated with said die so as to permit movement therepast of said one support member in said predetermined direction and to substantially prevent movement therepast of said one support member in an opposing direction.

2. A lightweight seat according to claim 1, and wherein said die is seated in a bored housing, there also being provided within said housing an element for retaining said die within said housing.

3. A lightweight seat according to claim 2, and wherein said housing and said die are made from a steel alloy.

4. A lightweight seat according to claim 2, and wherein said housing is mounted in association with the vehicle and has a single degree of rotational freedom with respect thereto so as to be rotatable about an axis substantially perpendicular to said predetermined direction.

5. A lightweight energy attenuating seat for a vehicle comprising:
  means for seating;
  an integrated assembly for mounting said means for seating onto the vehicle and including energy dissipation and stroke guide means including:
  at least one track means mounted onto the vehicle;
  at least one elongate, plastically deformable member for at least partially supporting said means for seating and arranged along and attached to said at least one track means, said at least one elongate, plastically deformable member having a first cross-sectional configuration;
  means associated with said at least one track means for mounting said at least one plastically deformable member and for permitting a stroke thereof and, consequently, of said means for seating, along said at least one track means, and being operative to plastically deform said at least one plastically deformable member so as to dissipate impact energy that would otherwise be transferred to said means for seating; said means for permitting comprising at least one assembly, associated with each of said at least one track means, for plastically deforming each of said at least one elongate, plastically deformable member, each said at least one assembly for plastically deforming comprising: a die defining an aperture of a second cross-sectional configuration different to said first cross-sectional configuration and through which an associated one of said at least one elongate, plastically deformable, member extends, movement of said one elongate, plastically deformable member through said aperture and in said predetermined direction being operative to cause plastic deformation of said elongate, plastically deformable member by said die, so as to impart said second cross-sectional configuration to at least a portion of the length of said elongate, plastically deformable member; and
  means for preventing rebound of said at least one elongate, plastically deformable member relative to said die and comprising means arranged in touching contact with said associated one of said at least one elongate, plastically deformable member and associated with said die so as to permit movement therepast of said associated one of said at least one support member in said predetermined direction and to oppose movement thereof in an opposing direction.

6. A lightweight seat according to claim 5, wherein said die is seated in a bored housing, there also being provided within said housing an element for retaining said die within said housing.

7. A lightweight seat according to claim 6, wherein said housing and said die are made from a steel alloy.

8. A lightweight seat according to claim 6, wherein said housing is mounted in association with the vehicle and has a single degree of rotational freedom with respect thereto so as to be rotatable about an axis substantially perpendicular to said predetermined direction.

9. A lightweight seat according to claim 5, wherein said at least one elongate plastically deformable member comprises a tube.

10. A lightweight seat according to claim 5, wherein said at least one track means is a pair of track means and said at least one elongate, plastically deformable, member is a pair of elongate, plastically deformable members.

11. A lightweight seat according to claim 5, wherein said at least one elongate, plastically deformable member is made from an aluminum alloy.

12. A lightweight seat according to claim 5, wherein said vehicle passenger seat is an aircraft passenger seat.

13. A lightweight seat according to claim 31, wherein said means for seating comprises a foldable seat element arranged, in an extended position, transversely to said means for mounting.

14. A lightweight seat according to claim 13, wherein said means for seating also comprises means for attaching a forward portion of said foldable seat element to said at least one elongate, plastically deformable member so as to transfer thereto a portion of a load imposed on said seat element.

15. A lightweight seat according to claim 5, wherein said means for seating comprises:
  a seat element; and
  means for attaching a forward portion of said seat element to said at least one elongate, plastically deformable member so as to transfer thereto a portion of a load imposed on said seat element.

16. A lightweight seat according to claim 5, wherein said vehicle passenger seat is a vertical takeoff aircraft passenger seat.

17. A lightweight seat according to claim 5, wherein the seat has a weight of no more than approximately 15 Kg.

* * * * *